US007047343B2

(12) United States Patent
Shaw

(10) Patent No.: US 7,047,343 B2
(45) Date of Patent: May 16, 2006

(54) SYSTEM AND METHOD FOR COMMUNICATION OF KEYBOARD AND TOUCHPAD INPUTS AS HID PACKETS EMBEDDED ON A SMBUS

(75) Inventor: Ronald D. Shaw, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 236 days.

(21) Appl. No.: 10/723,896

(22) Filed: Nov. 26, 2003

(65) Prior Publication Data

US 2005/0114571 A1 May 26, 2005

(51) Int. Cl.
*G06F 13/14* (2006.01)
*G06F 12/14* (2006.01)

(52) U.S. Cl. ........................................ 710/305; 726/22

(58) Field of Classification Search ................. 710/313
See application file for complete search history.

(56) References Cited

U.S. PATENT DOCUMENTS 4,087,654 A * 5/1978 Mueller ................. 379/406.08
5,446,906 A * 8/1995 Kardach et al. ............ 713/323
5,850,559 A 12/1998 Angelo et al. ......... 395/750.03
5,944,821 A 8/1999 Angelo ....................... 713/200
5,995,753 A * 11/1999 Walker ....................... 717/108
6,138,239 A 10/2000 Veil ........................... 713/200
2002/0129288 A1* 9/2002 Loh et al. .................. 713/320
2004/0268143 A1* 12/2004 Poisner ....................... 713/200
2005/0044408 A1* 2/2005 Bajikar et al. .............. 713/201
2005/0080950 A1* 4/2005 Rollig et al. .................. 710/52

FOREIGN PATENT DOCUMENTS

EP 497442 A2 * 8/1992

OTHER PUBLICATIONS

Maxim/Dallas Semiconductor. "Comparing the 12C Bus to the SMBus." Application Note 476. Dec. 1, 2000.*
Semtech. "Human Interface Device and System Management." Product Reference Guide. 2002.*
Bajikar, Sundeep "Trusted Mobile Keyboard Controller Architecture" Intel Developer Forum, Sep. 17, 2003.

* cited by examiner

*Primary Examiner*—Khanh Dang
*Assistant Examiner*—Matthew Spittle
(74) *Attorney, Agent, or Firm*—Hamilton & Terrile, LLP; Robert W. Holland

(57) ABSTRACT

Integrated pointing device and integrated keyboard inputs are accepted at a microcontroller that formats the inputs to the HID protocol and embeds the HID formatted inputs into SMBus messages for transfer over an SMBus to processing components of an information handling system. A state machine at the information handling system motherboard extracts the HID packets from the SMBus messages and provides the HID packets to HID registers for use by processing components. Keyboard and pointing device inputs communicated from integrated devices through an SMBus may be treated as trusted data separate from non-trusted inputs through external devices and buses.

18 Claims, 1 Drawing Sheet

SYSTEM AND METHOD FOR COMMUNICATION OF KEYBOARD AND TOUCHPAD INPUTS AS HID PACKETS EMBEDDED ON A SMBUS

BACKGROUND OF THE INVENTION

1. Field of the Invention

The present invention relates in general to the field of user inputs to an information handling system, and more particularly to a system and method for communication of keyboard and touchpad inputs as HID packets embedded on a SMBus.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically allow user inputs through a number of different types of devices. Most common is an external keyboard or external mouse that communicates user inputs as electrical signals through a wired or wireless connection to a port of the information handling system. For instance, a keyscan matrix identifies the position of a keystroke by a user based on an electrical signal communicated through a USB interface. Typically, a microcontroller in the chipset of the information handling system converts the keystroke into a Human Interface Device (HID) packet that is made available for use by components of the information handling system. However, user interfaces provided to an information handling system may originate from input devices located at a variety of locations near or far from the information handling system. Often, server information handling systems receive commands as keystrokes entered remotely through a network connection, such as through a network interface card. In contrast, portable information handling systems typically have integrated keyboards and integrated pointing devices, such as touchpad pointing devices, that are physically built into the housing of the information handling system along with the processing components.

One difficulty with integration of a keyboard and pointing device into a portable information handling system is that a bundle of wires is used to communicate signals from the keyboard to the motherboard of the information handling system and a separate set of wires is used for the pointing device. These separate sets of wires are bulky and thus have lead to movement in the industry to combine the keyscan function and the pointing device input detection at the location of the integrated pointing device in portable information handling systems.

Another difficulty that arises with different locations of user input devices is that hackers sometimes attempt to attack the security of information handling systems by entering simulated keystrokes and pointing device inputs through a network connection. In order to counter such attacks, industry has attempted to develop a "trusted" architecture that prevents remote access to certain information handling system functions. Generally, a trusted architecture prevents remote access to certain secured components of an information handling system, such as internal motherboard buses, like system management buses, such as the SMBus, the SPI bus and the I2C bus. One proposed trusted architecture is a trusted mobile keyboard controller that recognizes that inputs by users through integrated input devices, such as the integrated keyboard and pointing device of a portable computer, have greater security. By communicating inputs from integrated user interface devices and other trusted information through a proposed LPC bus at specific cycles, information handling systems are able to physically restrict remote access to certain functions.

SUMMARY OF THE INVENTION

Therefore a need has arisen for a system and method which communicates user inputs from integrated user input devices to information handling system components as trusted information.

A further need exists for a system and method which communicates trusted user inputs to components in a portable information handling system with reduced signal wire bulk.

In accordance with the present invention, a system and method are provided which substantially reduce the disadvantages and problems associated with previous systems and methods for communicating user inputs to information handling system components. Integrated keyboard and pointing device inputs are formatted into a protocol readable by information handling system components and the formatted user inputs are communicated to components through an internal motherboard bus, such as by embedding user input HID packets into SMBus messages.

More specifically, a trusted microcontroller receives user inputs from integrated pointing and keyboard input devices and formats the user inputs into HID packets. The trusted microcontroller embeds the HID packets into SMBus messages for communication across the motherboard of an information handling system as trusted information across a dual SMBus. A trusted state machine receives the SMBus messages and extracts the HID packets to make the user input information available to information handling system components through trusted HID registers. Information communicated across the SMBus may be handled as trusted information separate from information received through external input devices, such as through a conventional keyboard controller.

The present invention provides a number of important technical advantages. One example of an important technical advantage is that user inputs from integrated keyboard and pointing devices are communicated to information handling system components as trusted information. The use of an existing internal motherboard bus, such as the SMBus, ensures information integrity without having to add additional bus wires and supports existing HID packets. Further, a single driver manages both keyboard and pointing device inputs and allows inputs from integrated devices to be identified as trusted compared with non-trusted inputs from external input devices.

Another example of an important technical advantage is that communication of integrated keyboard and pointing device inputs through an existing internal motherboard bus, such as the SMBus, reduces signal wire bulk. Combining the keyscan and integrated pointing device functions frees up pins on the external keyboard controller to reduce cable size at a portable information handling system palm rest and eliminate the need for a cable from an integrated keyboard to the mother board. Combined keyboard and pointing device functions reduces assembly steps at manufacture of the information handling system and also helps to ensure that the proper keyboard is integrated with a system

BRIEF DESCRIPTION OF THE DRAWINGS

The present invention may be better understood, and its numerous objects, features and advantages made apparent to those skilled in the art by referencing the accompanying drawing.

DETAILED DESCRIPTION

Figure 1:
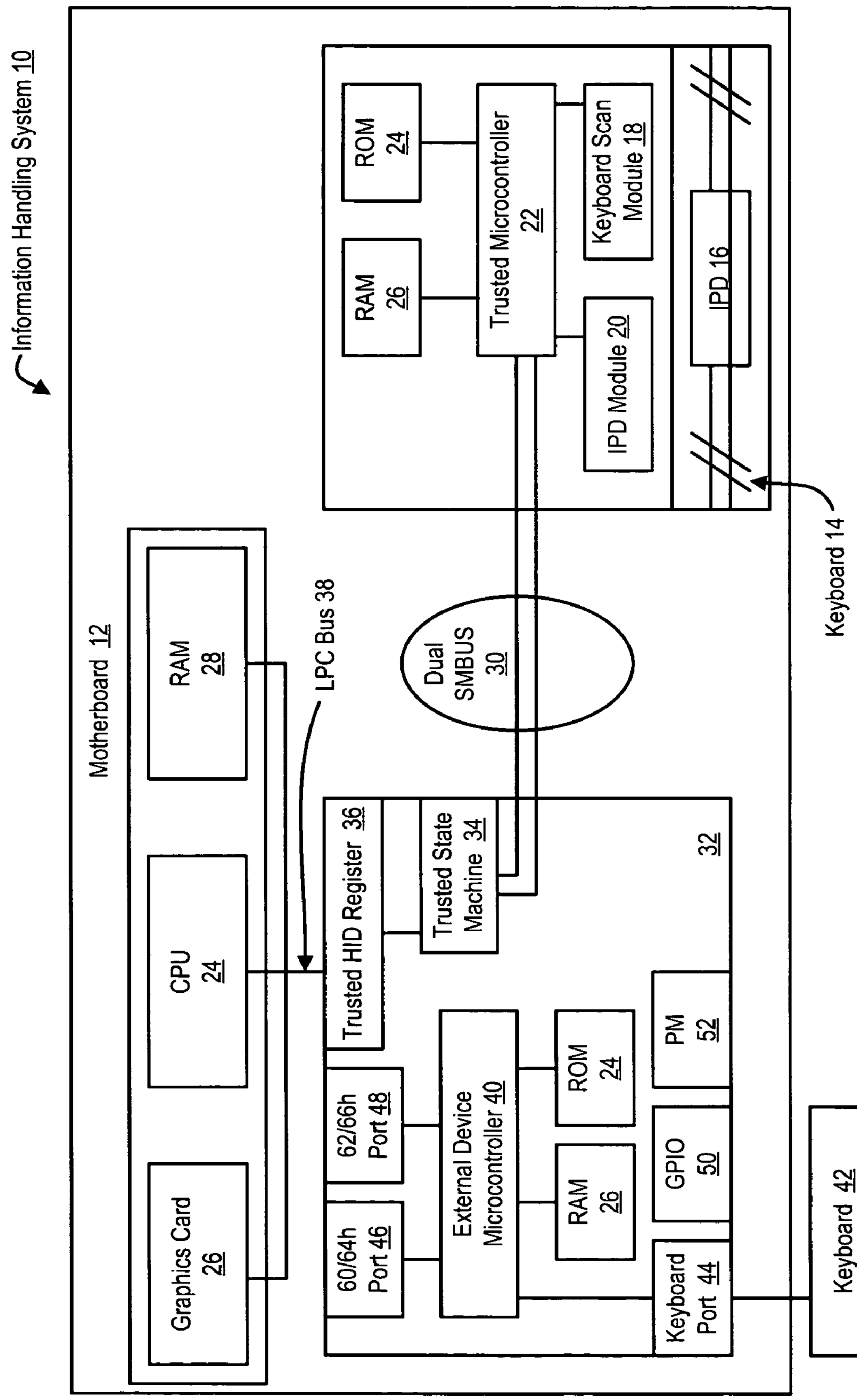
FIG. 1 depicts a block diagram of a portable information handling system having trusted inputs from integrated keyboard and pointing input devices.

Information handling system inputs to integrated pointing and keyboard devices are formatted and embedded in an internal motherboard bus to use by processing components as trusted information. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to FIG. 1, a block diagram depicts a portable information handling system 10 having trusted inputs to a motherboard 12 from an integrated keyboard 14 and an integrated pointing input device (IPD) 16. User inputs to keyboard 14 are captured as electrical signals by keyboard scan module 18. User inputs to integrated pointing device 16 are captured as electrical signals by IPD module 20. The user input electrical signals are communicated to trusted microcontroller 22 for formatting according to instructions from ROM 24 and in cooperation with local RAM 26.

Trusted microcontroller 22 formats integrated keyboard 14 and integrated pointing device 16 inputs in Human Interface Device (HID) protocol readable by firmware or software on processing components of information handling system 10, such as CPU 24, graphics card 26 and RAM 28. Once the user inputs are formatted in HID packets, trusted microcontroller 22 embeds the user input information for communication on an SMBus by mapping the HID packets into SMBus messages. The SMBus messages with the embedded HID packets are communicated across motherboard 12 through a dual SMBus 30 to chipset 32. Dual SMBus 30 is bi-directional and relies on a SMBus controller of information handling system 10 as a master controller to send information from trusted microcontroller 22 and a separate slave SMBus controller to receive information at trusted microcontroller 22. The slave SMBus controller responds to all addresses sent and allows the address byte to indicate endpoint and security information. The use of a dual SMBus reduces protocol complexity by ensuring that a bus is always available to send a message and reduces fabrication cost by elimination of a need for bus arbitration and routing to slave or master devices. In alternative embodiments, alternative internal motherboard bus structures may be used for trusted user input data communication instead of a dual SMBus, such as a single SMBus, an SPI bus or a I2C bus.

Dual SMBus 30 interfaces with chipset 32 at a trusted state machine 34 which extracts HID packets from SMBus messages and posts the HID packets in trusted HID register 36 for access by processing components, such as CPU 24. Trusted state machine 34 operates as firmware or software running on chipset 32, although in alternative embodiments trusted state machine 34 and trusted HID registers 36 may be placed in alternative locations of motherboard 12, such as CPU 24. An LPC bus 38 communicates trusted user inputs securely across motherboard 12, such as with selective LPC bus cycles. Inputs from integrated input devices, such as integrated keyboard 14 and integrated pointing device 16, are trusted since the inputs must originate at the information handling system. Trust in inputs from integrated user input devices is maintained by securely communicating the trusted inputs with the internal motherboard SMBus. An SMBus message consists of an Address byte followed by a message read or write. In one embodiment, bit 6 of the Address byte is used to indicate the presence of an HID packet with a value of zero indicating an HID packet and a value of 1 indicating a control packet.

Information handling system 10 also supports user inputs from conventional non-trusted devices, such as external keyboard 42 communicating through a PS/2 keyboard port interface 44 to an external device microcontroller 40. External device microcontroller 40 generates scan codes for use by processing components in a conventional manner, such as through 60/64h port 46 and 62/66h port 48. However, user inputs from external devices may not be treated as trusted inputs due to the suspect nature of information provide from non-integrated user interfaces. Accordingly, processing components such as CPU 24 may selectively apply inputs from trusted HID register 36 in a different manner from inputs of non-trusted registers 46 and 48, such as by limiting certain security functions to access by inputs received through trusted HID register 36. In alternative embodiments, trusted external keyboard devices whose physical locality is confirmed may also be provided access to trusted HID register 36, such as by routing the trusted external inputs through trusted microcontroller 22.

Although the present invention has been described in detail, it should be understood that various changes, substitutions and alterations can be made hereto without departing from the spirit and scope of the invention as defined by the appended claims.

What is claimed is:

1. An information handling system comprising:

a motherboard;

components coupled to the motherboard and operable to process information;

a trusted bus operable to securely communicate information between the components;

an integrated keyboard operable to accept user inputs;

an integrated pointing device operable to accept user inputs;

a microcontroller interfaced with the keyboard and pointing device, the microcontroller operable to convert keyboard and pointing device user inputs into HID packets and to embed the HID packets as messages on the trusted bus;

a state machine associated with the motherboard and interfaced with the trusted bus, the state machine operable to extract the HID packets from the trusted bus; and HID trusted registers interfaced with the state machine and operable to provide the HID packets to one or more of the components.

2. The information handling system of claim 1 wherein the trusted bus comprises a SMBus.

3. The information handling system of claim 2 wherein the trusted bus comprises a dual SMBus for bi-directional communication between the state machine and the microcontroller.

4. The information handling system of claim 1 wherein the trusted bus comprises a SPI bus.

5. The information handling system of claim 1 further comprising:

an external controller interfaced wit the motherboard, the external controller operable to accept user inputs from a external keyboard and to convert the external keyboard inputs into HID packets; and HID non-trusted registers interfaced with the external controller and operable to provide the external keyboard input HID packets to one or more of the components.

6. The information handling system of claim 5 wherein the components comprise a chip set for communicating with external devices and the state machine comprises firmware associated with the chipset.

7. The information handling system of claim 1 wherein the integrated pointing device comprises a touchpad.

8. A method for communicating user inputs to an information handling system, the method comprising:

detecting user inputs at an integrated pointing device and an integrated keyboard;

communicating the inputs to a common microcontroller;

converting the inputs with the microcontroller into HID packets;

embedding the HID packets as SMBus messages on an SMBus coupled to the motherboard bus; and extracting the HID packets at the motherboard for processing.

9. The method of claim 8 wherein the SMBus comprises a dual SMBus for bidirectional communication between the microcontroller and motherboard.

10. The method of claim 8 wherein extracting the HID packets further comprises:

receiving the SMBus messages at a state machine associated with the motherboard; and transferring SMBus messages having HID packets to HID registers accessible to one or more information processing components.

11. The method of claim 8 wherein the information handling system comprises a portable information handling system.

12. The method of claim 11 further comprising:

detecting user inputs at an external input device;

communicating the external input device inputs to a second microcontroller;

converting the inputs with the microcontroller into HID packets for communication to the motherboard;

processing HID packets from the integrated pointing device and integrated keyboard as trusted packets; and processing HID packets for the external input device as non-trusted packets.

13. The method of claim 8 wherein the internal motherboard bus comprises a I2C bus.

14. The method of claim 8 wherein the internal motherboard bus comprises a SPI bus.

15. A system for communicating trusted user inputs from a user input device to information processing components of an information handling system, the system comprising:

a first microcontroller operable to accept user inputs from an integrated keyboard and an integrated pointing device, to convert the user inputs into a format readable by processing components, and to embed the formatted user inputs into SMBus messages;

an SMBus interfaced with the microcontroller and operable to transfer the formatted user inputs to a motherboard of the information handling system;

a processing component interfaced with the SMBus and operable to extract the formatted user inputs from the SMBus messages; and a second microcontroller operable to accept user inputs at an external keyboard and to provide the external keyboard inputs to the motherboard through a non-trusted communication channel.

16. The system of claim 15 wherein the formatted user inputs comprise HID packets.

17. The system of claim 16 wherein the processing component interfaced with the SMBus comprises a state machine and one or more HID registers.

18. The system of claim 17 wherein the SMBus comprises a dual SMBus operable to communicate bi-directionally between the microcontroller mid the state machine.

* * * * *